United States Patent
Wang et al.

(10) Patent No.: US 11,632,109 B2
(45) Date of Patent: Apr. 18, 2023

(54) STRONG AND WEAK HYBRID PUF CIRCUIT

(71) Applicant: Wenzhou University, Zhejiang (CN)

(72) Inventors: Pengjun Wang, Zhejiang (CN); Jiana Lian, Zhejiang (CN); Gang Li, Zhejiang (CN); Ziyu Zhou, Zhejiang (CN)

(73) Assignee: Wenzhou University, Zhejiang (CN)

( * ) Notice: Subject to any disclaimer, the term of this patent is extended or adjusted under 35 U.S.C. 154(b) by 18 days.

(21) Appl. No.: 17/541,272

(22) Filed: Dec. 3, 2021

(65) Prior Publication Data

US 2022/0224333 A1 Jul. 14, 2022

(30) Foreign Application Priority Data

Jan. 13, 2021 (CN) .......................... 202110043093.6

(51) Int. Cl.
*H03K 19/003* (2006.01)
*H03K 19/21* (2006.01)
*H03K 3/037* (2006.01)
*H03K 5/01* (2006.01)
*H03K 5/00* (2006.01)

(52) U.S. Cl.
CPC .......... *H03K 19/003* (2013.01); *H03K 3/037* (2013.01); *H03K 5/01* (2013.01); *H03K 19/21* (2013.01); *H03K 2005/00013* (2013.01)

(58) Field of Classification Search
CPC ...... H03K 19/003; H03K 19/02; H03K 19/08; H03K 19/094; H03K 19/20; H03K 19/21; H03K 2005/00013; H03K 3/02; H03K 3/027; H03K 3/0375; H04L 9/3278
See application file for complete search history.

(56) References Cited

U.S. PATENT DOCUMENTS

| | | | | |
|---|---|---|---|---|
| 9,279,850 | B1* | 3/2016 | Pedersen | G01R 27/2605 |
| 9,584,329 | B1* | 2/2017 | Trimberger | H04L 9/3278 |
| 10,432,198 | B1* | 10/2019 | Wang | G06F 1/10 |
| 10,607,033 | B2* | 3/2020 | Kuenemund | G09C 1/00 |
| 10,630,492 | B2* | 4/2020 | Guilley | G09C 1/00 |

(Continued)

OTHER PUBLICATIONS

Daihyun Lim et al., "Extracting Secret Keys From Integrated Circuits", IEEE Transactions on Very Large Scale Integration (VLSI) Systems, Oct. 2005, pp. 1200-1205.

*Primary Examiner* — Jason Crawford
(74) *Attorney, Agent, or Firm* — JCIP Global Inc.

(57) ABSTRACT

A strong and weak hybrid PUF circuit comprises N switch units and an arbiter. Each switch unit consists of two delay modules and two 2:1 multiplexers. The N switch units constitute two completely symmetrical delay paths. Each delay module consists of six stages of delay cells. During the operating process, a transmission signal selects a turn-on path of the corresponding 2:1 multiplexers according to activation signals; the switch units in the PUF circuit are in a valid state (if the delay modules are turned on) or in an invalid state (if the delay modules are not turned on) according to whether the delay modules are turned during the operating process; and the strong and weak hybrid PUF circuit can be flexibly configured to be of two different types (a strong PUF circuit and a weak PUF circuit) according to changes of the Hamming weight of input activation signals.

4 Claims, 6 Drawing Sheets

(56) References Cited

U.S. PATENT DOCUMENTS

| | | | |
|---|---|---|---|
| 10,958,453 B2* | 3/2021 | Lu ............................ | G06F 21/73 |
| 2015/0008763 A1* | 1/2015 | Kuenemund ............ | H03K 3/84 |
| | | | 307/115 |
| 2016/0028394 A1* | 1/2016 | Tasher ................. | H03K 19/003 |
| | | | 326/8 |
| 2019/0058602 A1* | 2/2019 | Wang ...................... | G06F 21/72 |
| 2019/0140643 A1* | 5/2019 | Kuenemund ......... | H04L 9/0866 |
| 2021/0336804 A1* | 10/2021 | Parhi ...................... | G06F 21/73 |
| 2022/0224333 A1* | 7/2022 | Wang ................. | H03K 19/003 |

\* cited by examiner

STRONG AND WEAK HYBRID PUF CIRCUIT

CROSS-REFERENCE TO RELATED APPLICATION

This application claims the priority benefit of China application serial no. 202110043093.6, filed on Jan. 13, 2021. The entirety of the above-mentioned patent application is hereby incorporated by reference herein and made a part of this specification.

BACKGROUND

Technical Field

The invention relates to a PUF circuit, in particular to a strong and weak hybrid PUF circuit.

Description of Related Art

Physically unclonable function (PUF) can guarantee information security in the physical layer of chips, thus having gained more and more attention. A PUF circuit is a promising embedded key generation circuit that is able to generate a series of random, unique and unclonable output keys by capturing random process deviations of PUF units. These output keys may be applied to the information security field, such as key generation, equipment identification and IP protection.

At present, there are typically two types of PUF circuits: weak PUF circuits and strong PUF circuits. Each PUF unit of the weak PUF circuits can only generate one bit of output response, so the output responses are mutually independent. Responses generated by the strong PUF circuits are correlated because of the reconstruction of process sensitive units. So, compared with the strong PUF circuits, the weak PUF circuits can better resist modeling attacks and machining learning attacks. However, the weak PUF circuits have the following defect in actual application: the hardware overhead that grows proportionately with the length of the output response when exponential multiple output responses need to be generated.

Of all existing PUF design schemes, Document 1 (D Lim, J Lee, B Gassend, et al., Extracting Secret Keys from Inte-grated Circuits [J]. IEEE Transactions on Very Large Scale Integration Systems, 2005, 13(10): 1200-1205) discloses an APUF circuit which is a typical strong PUF circuit, in which two completely symmetrical signal transmission paths are constructed and each consists of n switch units, wherein n is an integer greater than or equal to 2, an arbiter is disposed at the tail end of the circuit, each switch unit consists of two multiplexers, and an output response is determined by comparing the sequential order in which the same pulse signal reaches the arbiter along the two signal transmission paths. The structure of the circuit is shown in FIG. 1, wherein C is an input activation, ID is an output response, the switch units constituting the APUF are mainly used to select different delay paths, and the activation signal $C=C_1, C_2, \ldots, C_n$ is configured to determine whether the signal transmission paths are turned on directly or in a crossed manner.

Although the output responses of the APUF circuit disclosed by Document 1 have good uniqueness and reliability, the APUF circuit is a strong PUF circuit that is able to generate only one type of activation response pairs, namely stimulus response pairs for strong PUF, so the APUF circuit is only suitable for scenarios requiring a large number of activation response pairs (such as equipment identification), and the application scenarios of the APUF circuit are limited; in addition, during the operating process of the APUF circuit, the switch units are turned on in parallel or in a crossed manner merely by inputting the activation C, and the number of the switch units in the whole PUF circuit is not affected, so the overall circuit structure will not be changed, and dynamic reconstruction of the structure of the PUF circuit cannot be realized.

SUMMARY

The technical issue to be settled by the invention is to provide a strong and weak hybrid PUF circuit that is able to generate strong PUF activation response pairs as well as weak PUF activation response pairs, has a broader application prospect, and is able to realize dynamic reconfiguration of the internal structure.

The technical solution adopted by the invention to settle the aforesaid technical issue is as follows: a strong and weak hybrid PUF circuit, comprising N switch units and an arbiter, wherein N is an integer greater than or equal to 2, the arbiter comprises a first input terminal, a second input terminal and an output terminal, each switch unit consists of two delay modules and two 2:1 multiplexers, the N switch units form two completely symmetrical delay paths, and each 2:1 multiplexer comprises a first input terminal, a second input terminal, a control terminal and an output terminal; each of the two delay modules consists of six stages of delay cells, wherein an $i^{th}$ stage of delay cell consists of $2^{6-i}$ 2:1 multiplexers, wherein i=1, 2, 3, 4, 5, 6, for i=1, the control terminals of the $2^5$ 2:1 multiplexers of the first stage of delay cell are connected, a connecting terminal is used as a first input terminal of the delay module, for i=2, the control terminals of the $2^4$ 2:1 multiplexers of the second stage of delay cell are connected, a connecting terminal is used as a second input terminal of the delay module, for i=3, the control terminals of the $2^3$ 2:1 multiplexers of the third stage of delay cell are connected, a connecting terminal is used as a third input terminal of the delay module, for i=4, the control terminals of the $2^2$ 2:1 multiplexers of the fourth stage of delay cell are connected, a connecting terminal is used as a fourth input terminal of the delay module, for i=5, the control terminals of the two 2:1 multiplexers of the fifth stage of delay cell are connected, a connecting terminal is used as a fifth input terminal of the delay module, and for i=6, the control terminal of the 2:1 multiplexer of the sixth stage of delay cell is used as a sixth input terminal of the delay module; wherein a logic 1 is accessed to the first input terminal of each 2:1 multiplexer of the first stage of delay cell, a logic 0 is accessed to the second input terminal of each 2:1 multiplexer of the first stage of delay cell, the output terminal of the first 2:1 multiplexer of the first stage of delay cell is connected to the first input terminal of the first 2:1 multiplexer of the second stage of delay cell, the output terminal of the second 2:1 multiplexer of the first stage of delay cell is connected to the second input terminal of the first 2:1 multiplexer of the second stage of delay cell, the output terminal of the third 2:1 multiplexer of the first stage of delay cell is connected to the first input terminal of the second 2:1 multiplexer of the second stage of delay cell, the output terminal of the fourth 2:1 multiplexer of the first stage of delay cell is connected to the second input terminal of the second 2:1 multiplexer of the second stage of delay cell, the output terminal of the fifth 2:1 multiplexer of the first stage of delay cell is connected to the first input terminal of the third 2:1 multiplexer of the second stage of delay cell, the output terminal of the sixth 2:1 multiplexer of the first stage of delay cell is connected to the second input terminal of the third 2:1 multiplexer of the second stage of delay cell, and so on, until the output terminal of the $31^{st}$ 2:1 multiplexer of the first stage of delay cell is connected to the first input terminal of the sixteenth 2:1 multiplexer of the second stage of delay cell, and the output terminal of the $32^{st}$ 2:1 multiplexer of the first stage of delay cell is connected to the second input terminal of the sixteenth 2:1 multiplexer of the second stage of delay cell; wherein the output terminal of the first 2:1 multiplexer of the second stage of delay cell is connected to the first input terminal of the first 2:1 multiplexer of the third stage of delay cell, the output terminal of the second 2:1 multiplexer of the second stage of delay cell is connected to the second input terminal of the first 2:1 multiplexer of the third stage of delay cell, the output terminal of the third 2:1 multiplexer of the second stage of delay cell is connected to the first input terminal of the second 2:1 multiplexer of the third stage of delay cell, the output terminal of the fourth 2:1 multiplexer of the second stage of delay cell is connected to the second input terminal of the second 2:1 multiplexer of the third stage of delay cell, the output terminal of the fifth 2:1 multiplexer of the second stage of delay cell is connected to the first input terminal of the third 2:1 multiplexer of the third stage of delay cell, the output terminal of the sixth 2:1 multiplexer of the second stage of delay cell is connected to the second input terminal of the third 2:1 multiplexer of the third stage of delay cell, and so on, until the output terminal of the fifteenth 2:1 multiplexer of the second stage of delay cell is connected to the first input terminal of the eighth 2:1 multiplexer of the third stage of delay cell, and the output terminal of the sixteenth 2:1 multiplexer of the first stage of delay cell is connected to the second input terminal of the eighth 2:1 multiplexer of the third stage of delay cell; wherein the output terminal of the first 2:1 multiplexer of the third stage of delay cell is connected to the first input terminal of the first 2:1 multiplexer of the fourth stage of delay cell, the output terminal of the second 2:1 multiplexer of the third stage of delay cell is connected to the second input terminal of the first 2:1 multiplexer of the fourth stage of delay cell, the output terminal of the third 2:1 multiplexer of the third stage of delay cell is connected to the first input terminal of the second 2:1 multiplexer of the fourth stage of delay cell, the output terminal of the fourth 2:1 multiplexer of the third stage of delay cell is connected to the second input terminal of the second 2:1 multiplexer of the fourth stage of delay cell, the output terminal of the fifth 2:1 multiplexer of the third stage of delay cell is connected to the first input terminal of the third 2:1 multiplexer of the fourth stage of delay cell, the output terminal of the sixth 2:1 multiplexer of the third stage of delay cell is connected to the second input terminal of the third 2:1 multiplexer of the fourth stage of delay cell, and so on, until the output terminal of the seventh 2:1 multiplexer of the third stage of delay cell is connected to the first input terminal of the fourth 2:1 multiplexer of the fourth stage of delay cell, and the output terminal of the eighth 2:1 multiplexer of the third stage of delay cell is connected to the second input terminal of the fourth 2:1 multiplexer of the fourth stage of delay cell; wherein the output terminal of the first 2:1 multiplexer of the fourth stage of delay cell is connected to the first input terminal of the first 2:1 multiplexer of the fifth stage of delay cell, the output terminal of the second 2:1 multiplexer of the fourth stage of delay cell is connected to the second input terminal of the first 2:1 multiplexer of the fifth stage of delay cell, the output terminal of the third 2:1 multiplexer of the fourth stage of delay cell is connected to the first input terminal of the second 2:1 multiplexer of the fifth stage of delay cell, the output terminal of the fourth 2:1 multiplexer of the fourth stage of delay cell is connected to the second input terminal of the second 2:1 multiplexer of the fifth stage of delay cell, the output terminal of the first 2:1 multiplexer of the fifth stage of delay cell is connected to the first input terminal of the first 2:1 multiplexer of the sixth stage of delay cell, the output terminal of the second 2:1 multiplexer of the fifth stage of delay cell is connected to the second input terminal of the first 2:1 multiplexer of the sixth stage of delay cell, and the output terminal of the first 2:1 multiplexer of the sixth stage of delay cell is the output terminal of the delay module; wherein the two delay modules of each switch unit are referred to as a first delay module and a second delay module respectively, and the two 2:1 multiplexers are referred to as a first 2:1 multiplexer and a second 2:1 multiplexer respectively; wherein in each switch unit, a power voltage is accessed to the second input terminals to the sixth input terminals of the first delay module and the second delay module, the first input terminal of the first delay module is connected to the first input terminal of the first 2:1 multiplexer, a connecting terminal is used as a first input terminal of the switch unit, the first input terminal of the second delay module is connected to the first input terminal of the second 2:1 multiplexer, a connecting terminal is used as a second input terminal of the switch unit, the output terminal of the first delay module is connected to the second input terminal of the first 2:1 multiplexer, the output terminal of the second delay module is connected to the second input terminal of the second 2:1 multiplexer, the output terminal of the first 2:1 multiplexer is used as a first output terminal of the switch unit, the output terminal of the second 2:1 multiplexer is used as a second output terminal of the switch unit, the control terminal of the first 2:1 multiplexer is connected to the control terminal of the second 2:1 multiplexer, a connecting terminal is used as a control terminal of the switch unit, the first input terminal and the second input terminal of the first switch unit are connected, a connecting terminal is an input terminal of the strong and weak hybrid PUF circuit to which a pulse signal is accessed, the first output terminal of the $k^{th}$ switch unit is connected to the first input terminal of the $(k+1)^{th}$ switch unit, the second output terminal of the $k^{th}$ switch unit is connected to the second input terminal of the $(k+1)^{th}$ switch unit, k=1, 2, . . . , N−1, the first output terminal of the $N^{th}$ switch unit is connected to the first input terminal of the arbiter, the second output terminal of the $N^{th}$ switch unit is connected to the second input terminal of the arbiter, and the output terminal of the arbiter is used as an output terminal of the strong and weak hybrid PUF circuit and is used to output an original response signal; and the control terminals of the N switch units are used as N control terminals of the strong and weak hybrid PUF circuit to receive N activation signals to be accessed thereto.

The arbiter comprises a first NAND gate and a second NAND gate, wherein each of the first NAND gate and the second NAND gate comprises a first input terminal, a second input terminal and an output terminal, the first input terminal of the first NAND gate is the first input terminal of the arbiter, the second input terminal of the first NAND gate is connected to the output terminal of the second NAND gate, the first input terminal of the second NAND gate is connected to the output terminal of the first NAND gate, a connecting terminal is the output terminal of the arbiter, and the second input terminal of the second NAND gate is the second input terminal of the arbiter.

Each 2:1 multiplexer comprises a first inverter, a second inverter, a third inverter, a fourth inverter, a first NMOS transistor, a second NMOS transistor, a first PMOS transistor and a second PMOS transistor, wherein an input terminal of the first inverter is the first input terminal of the 2:1 multiplexer, an input terminal of the second inverter is the second input terminal of the 2:1 multiplexer, an input terminal of the third inverter, a gate of the first PMOS transistor and a gate of the second NMOS transistor are connected, a connecting terminal is the control terminal of the 2:1 multiplexer, an output terminal of the first inverter, a source of the first NMOS transistor and a source of the first PMOS transistor are connected, an output terminal of the second inverter, a source of the second NMOS transistor and a source of the second PMOS transistor are connected, an output terminal of the third inverter, a gate of the first NMOS transistor and a gate of the second PMOS transistor are connected, a drain of the first PMOS transistor, a drain of the first NMOS transistor, a drain of the second PMOS transistor, a drain of the second NMOS transistor and an input terminal of the fourth inverter are connected, and an output terminal of the fourth inverter is the output terminal of the 2:1 multiplexer. The 2:1 multiplexer consists of a transmission gate composed of the four inverters, the first PMOS transistor and the first NMOS transistor, as well as a transmission gate composed of the second PMOS transistor and the second NMOS transistor, wherein a source of each transmission gate is used as a data input terminal, drains of the two transmission gates are connected to be used as an output terminal, and gates of the two transmission gates are correspondingly connected to be used as two control terminals to which a pair of control signals opposite in phase are accessed, such that the two transmission gates are used as analog switches to transmit continuously changing analog signals to realize functions that cannot be fulfilled by existing common logic gates, any one of the data input terminals of the two transmission gates can be selected for output by means of different configurations of the control terminals to fulfill a data selection function, and thus, one-out-of-two function of data is realized by means of a simple circuit structure.

A post-processing circuit is disposed at the output terminal of the arbiter, an original response signal output by the output terminal of the arbiter is processed by the post-processing circuit and is then output as a final response signal, the post-processing circuit comprises twelve D flip-flops and a six-input XOR gate, each D flip-flop comprises a clock terminal, an input terminal and an output terminal, the six-input XOR gate comprises sixth input terminals and an output terminal, the clock terminals of the twelve D flip-flops are connected, a connecting terminal is used as a clock terminal of the post-processing circuit to receive a clock signal, the input terminal of the first D flip-flop is used as an input terminal of the post-processing circuit and is connected to the output terminal of the arbiter, the output terminal of the $h^{th}$ D flip-flop is connected to the input terminal of the $(h+1)^{th}$ D flip-flop, and h=1, 2, . . . , 11; the output terminal of the first D flip-flop, the output terminal of the third D flip-flop, the output terminal of the fifth D flip-flop, the output terminal of the seventh D flip-flop, the output terminal of the ninth D flip-flop and the output terminal of the eleventh D flip-flop are connected to the six input terminals of the six-input XOR gate in one-to-one correspondence, and the output terminal of the six-input XOR gate is used as an output terminal of the post-processing circuit and is configured to output the final response signal. In this circuit, the D flip-flops are used to store 0/1, the six-input XOR gate performs an XOR operation on outputs of N D flip-flops to obtain a final response signal, and the twelve D flip-flops constitute a shift register module, so that the randomness of output responses is improved, and the correlation between the output responses is reduced.

Compared with the prior art, the invention has the following advantages: each switch unit consists of two delay modules and two multiplexers, N switch units form two completely symmetrical delay paths, and each delay module consists of six stages of delay cells, wherein an $i^{th}$ stage of delay cell consists of $2^{6-i}$ multiplexers, i=1, 2, 3, 4, 5, 6, for i=1, control terminals of the $2^5$ multiplexers of the first stage of delay cell are connected, a connecting terminal is used as a first input terminal of the delay module, for i=2, control terminals of the $2^4$ multiplexers of the second stage of delay cell are connected, a connecting terminal is used as a second input terminal of the delay module, for i=3, control terminals of the $2^3$ multiplexers of the third stage of delay cell are connected, a connecting terminal is used as a third input terminal of the delay module, for i=4, control terminals of the $2^2$ multiplexers of the fourth stage of delay cell are connected, a connecting terminal is used as a fourth input terminal of the delay module, for i=5, control terminals of the two multiplexers of the fifth stage of delay cell are connected, a connecting terminal is used as a fifth input terminal of the delay module, and for i=6, a control terminal of the multiplexer of the sixth stage of delay cell is used as a sixth input terminal of the delay module; a logic 1 is accessed to a first input terminal of each multiplexer of the first stage of delay cell, a logic 0 is accessed to a second input terminal of each multiplexer of the first stage of delay cell, an output terminal of the first multiplexer of the first stage of delay cell is connected to the first input terminal of the first multiplexer of the second stage of delay cell, an output terminal of the second multiplexer of the first stage of delay cell is connected to the second input terminal of the first multiplexer of the second stage of delay cell, an output terminal of the third multiplexer of the first stage of delay cell is connected to the first input terminal of the second multiplexer of the second stage of delay cell, the output terminal of the fourth multiplexer of the first stage of delay cell is connected to the second input terminal of the second multiplexer of the second stage of delay cell, an output terminal of the fifth multiplexer of the first stage of delay cell is connected to the first input terminal of the third multiplexer of the second stage of delay cell, an output terminal of the sixth multiplexer of the first stage of delay cell is connected to the second input terminal of the third multiplexer of the second stage of delay cell, and so on, until an output terminal of the $31^{st}$ multiplexer of the first stage of delay cell is connected to the first input terminal of the sixteenth multiplexer of the second stage of delay cell, and an output terminal of the $32^{st}$ multiplexer of the first stage of delay cell is connected to the second input terminal of the sixteenth multiplexer of the second stage of delay cell; an output terminal of the first multiplexer of the second stage of delay cell is connected to the first input terminal of the first multiplexer of the third stage of delay cell, an output terminal of the second multiplexer of the second stage of delay cell is connected to the second input terminal of the first multiplexer of the third stage of delay cell, an output terminal of the third multiplexer of the second stage of delay cell is connected to the first input terminal of the second multiplexer of the third stage of delay cell, an output terminal of the fourth multiplexer of the second stage of delay cell is connected to the second input terminal of the second multiplexer of the third stage of delay cell, an output terminal of the fifth multiplexer of the second stage of delay cell is connected to the first input terminal of the third multiplexer of the third stage of delay cell, an output terminal of the sixth multiplexer of the second stage of delay cell is connected to the second input terminal of the third multiplexer of the third stage of delay cell, and so on, until an output terminal of the fifteenth multiplexer of the second stage of delay cell is connected to the first input terminal of the eighth multiplexer of the third stage of delay cell, and an output terminal of the sixteenth multiplexer of the first stage of delay cell is connected to the second input terminal of the eighth multiplexer of the third stage of delay cell; an output terminal of the first multiplexer of the third stage of delay cell is connected to the first input terminal of the first multiplexer of the fourth stage of delay cell, an output terminal of the second multiplexer of the third stage of delay cell is connected to the second input terminal of the first multiplexer of the fourth stage of delay cell, an output terminal of the third multiplexer of the third stage of delay cell is connected to the first input terminal of the second multiplexer of the fourth stage of delay cell, an output terminal of the fourth multiplexer of the third stage of delay cell is connected to the second input terminal of the second multiplexer of the fourth stage of delay cell, an output terminal of the fifth multiplexer of the third stage of delay cell is connected to the first input terminal of the third multiplexer of the fourth stage of delay cell, an output terminal of the sixth multiplexer of the third stage of delay cell is connected to the second input terminal of the third multiplexer of the fourth stage of delay cell, and so on, until an output terminal of the seventh multiplexer of the third stage of delay cell is connected to the first input terminal of the fourth multiplexer of the fourth stage of delay cell, and an output terminal of the eighth multiplexer of the third stage of delay cell is connected to the second input terminal of the fourth multiplexer of the fourth stage of delay cell; an output terminal of the first multiplexer of the fourth stage of delay cell is connected to the first input terminal of the first multiplexer of the fifth stage of delay cell, an output terminal of the second multiplexer of the fourth stage of delay cell is connected to the second input terminal of the first multiplexer of the fifth stage of delay cell, an output terminal of the third multiplexer of the fourth stage of delay cell is connected to the first input terminal of the second multiplexer of the fifth stage of delay cell, an output terminal of the fourth multiplexer of the fourth stage of delay cell is connected to the second input terminal of the second multiplexer of the fifth stage of delay cell, an output terminal of the first multiplexer of the fifth stage of delay cell is connected to the first input terminal of the first multiplexer of the sixth stage of delay cell, an output terminal of the second multiplexer of the fifth stage of delay cell is connected to the second input terminal of the first multiplexer of the sixth stage of delay cell, and an output terminal of the first multiplexer of the sixth stage of delay cell is an output terminal of the delay module; the two delay modules of each switch unit are referred to as a first delay module and a second delay module respectively, and the two multiplexers are referred to as a first multiplexer and a second multiplexer respectively; in each switch unit, a power voltage is accessed to the second input terminals to the sixth input terminals of the first delay module and the second delay module, the first input terminal of the first delay module is connected to the first input terminal of the first multiplexer, a connecting terminal is used as a first input terminal of the switch unit, the first input terminal of the second delay module is connected to the first input terminal of the second multiplexer, a connecting terminal is used as a second input terminal of the switch unit, the output terminal of the first delay module is connected to the second input terminal of the first multiplexer, the output terminal of the second delay module is connected to the second input terminal of the second multiplexer, the output terminal of the first multiplexer is used as a first output terminal of the switch unit, the output terminal of the second multiplexer is used as a second output terminal of the switch unit, the control terminal of the first multiplexer is connected to the control terminal of the second multiplexer, a connecting terminal is used as a control terminal of the switch unit, the first input terminal and the second input terminal of the first switch unit are connected, a connecting terminal is an input terminal of the strong and weak hybrid PUF circuit to which a pulse signal is accessed, the first output terminal of the $k^{th}$ switch unit is connected to the first input terminal of the $(k+1)^{th}$ switch unit, the second output terminal of the $k^{th}$ switch unit is connected to the second input terminal of the $(k+1)^{th}$ switch unit, k=1, 2, . . . , N−1, the first output terminal of the $N^{th}$ switch unit is connected to the first input terminal of the arbiter, the second output terminal of the $N^{th}$ switch unit is connected to the second input terminal of the arbiter, and the output terminal of the arbiter is used as an output terminal of the strong and weak hybrid PUF circuit and is used to output an original response signal; and the control terminals of the N switch units are used as N control terminals of the strong and weak hybrid PUF circuit and to receive N activation signals. During the operating process, the strong and weak hybrid PUF circuit of the invention can be flexibly configured to be of two different types (strong PUF type and weak PUF type) according to changes of the Hamming weight of input activation signals, the input activation signals are a series of binary sequences $C_1, C_2, \ldots, C_N$, and a transmission signal selects a turn-on path of corresponding 2:1 multiplexers according to activation; when $C_f=1$ (f=1, 2, . . . , N), a pulse signal selects a turn-on path of the 2:1 multiplexers with delay modules; otherwise, the pulse signal selects a turn-on path of the 2:1 multiplexers without delay modules; finally, the arrival sequence of two delay signals is determined by an arbiter to generate an output response "0" or "1", and the switch units in the PUF circuit are in a valid state (if the delay modules are turned on) or in an invalid state (if the delay modules are not turned on) according to whether the delay modules are turned during the operating process, and in this case, the Hamming weight of the input activation signals is mapped to the circuit and reflects the number of valid switch units. In case where the PUF circuit is of a weak PUF circuit, only one valid switch unit participate in signal transmission during the operating process of the circuit, the Hamming weight of the input activation signals is 1, N groups of activation signals are input totally, only one delay module is turned on every time pulse signals are transmitted along the two paths, and finally the signals transmitted along the two paths reach the arbiter to generate an output response. Different from the weak PUF circuit, multiple valid switch unit in the delay paths of the strong PUF circuit participate in the signal transmission process (the Hamming weight of the input activation signals is greater than 1), and in this case, the PUF circuit is of a strong PUF structure. So, the strong and weak hybrid PUF circuit of the invention is able to generate strong PUF activation response pairs as well as weak PUF activation response pairs, thus having broader application scenarios and being able to realize dynamic reconfiguration of the internal structure.

DESCRIPTION OF THE EMBODIMENTS

The invention will be described in further detail below in conjunction with the accompanying drawings and embodiments.

Figure 1:
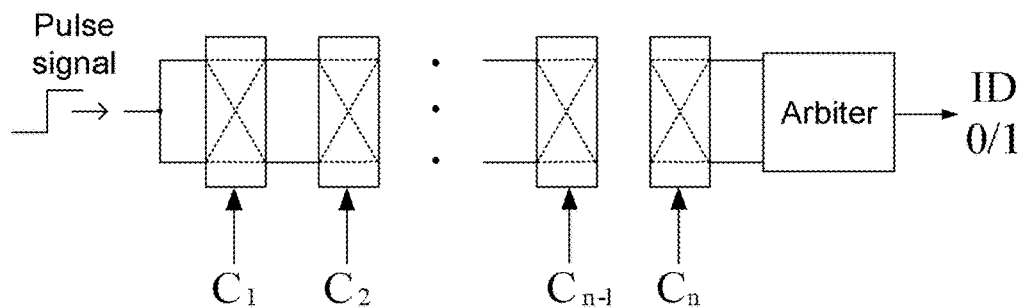
FIG. 1 is a schematic diagram of an existing APUF circuit.
Figure 2:
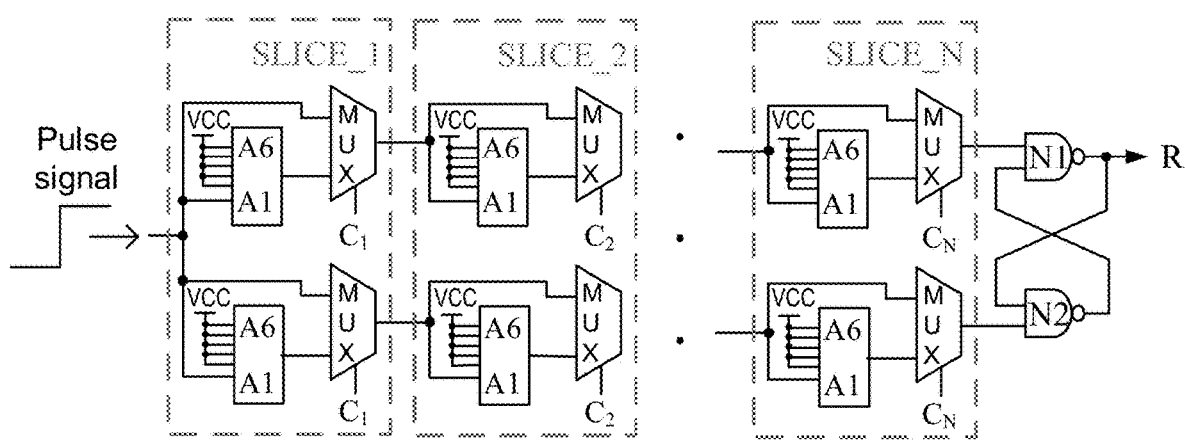
FIG. 2 is a circuit diagram of a strong and weak hybrid PUF circuit of the invention.
Figure 3:
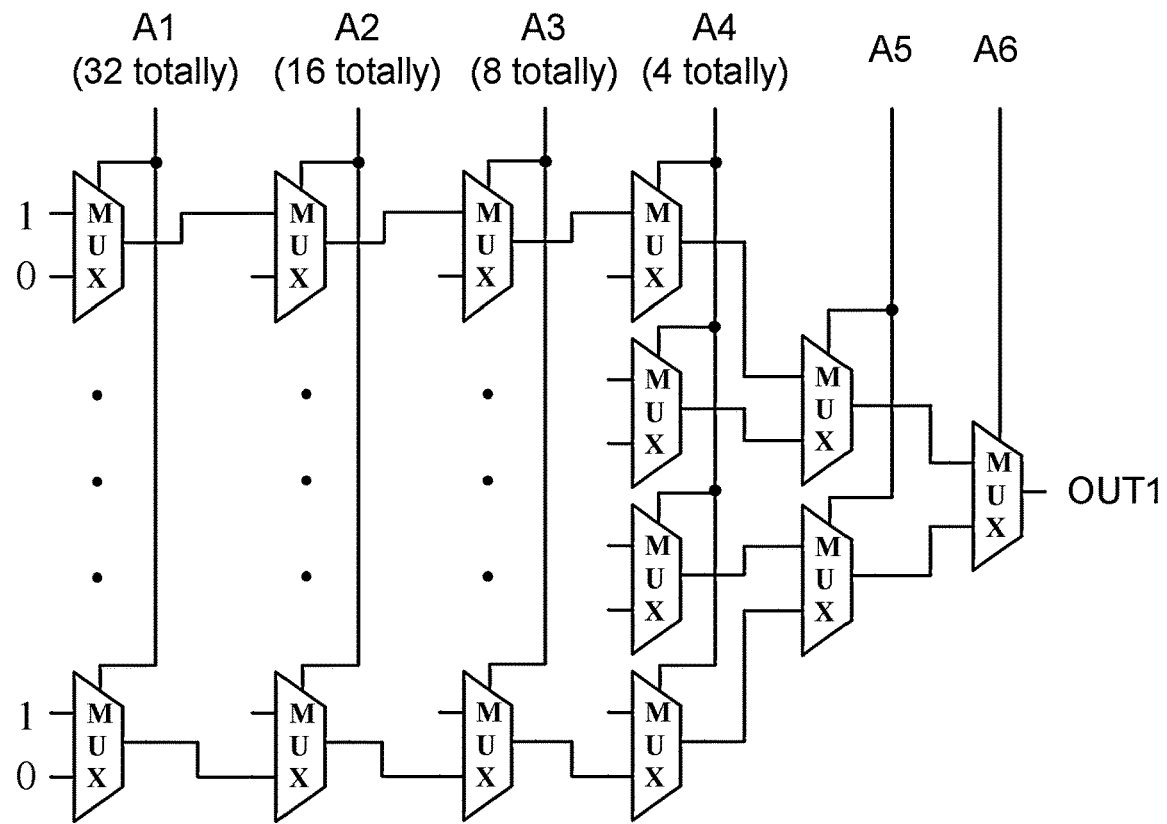
FIG. 3 is a circuit diagram of a delay module of the strong and weak hybrid PUF circuit of the invention.

Embodiment 1: As shown in FIG. 2 and FIG. 3, a strong and weak hybrid PUF circuit comprises N switch units SLICE_1-SLICE_N and an arbiter, wherein N is an integer greater than or equal to 2, the arbiter comprises a first input terminal, a second input terminal and an output terminal, each switch unit consists of two delay modules and two 2:1 multiplexers, the N switch units form two completely symmetrical delay paths, and each 2:1 multiplexer comprises a first input terminal, a second input terminal, a control terminal and an output terminal; each delay module consists of six stages of delay cells, wherein an $i^{th}$ stage of delay cell consists of $2^{6-i}$ 2:1 multiplexers, i=1, 2, 3, 4, 5, 6, the control terminals of the $2^5$ 2:1 multiplexers of the first stage of delay cell are connected, a connecting terminal is used as a first input terminal of the delay module, the control terminals of the $2^4$ 2:1 multiplexers of the second stage of delay cell are connected, a connecting terminal is used as a second input terminal of the delay module, the control terminals of the $2^3$ 2:1 multiplexers of the third stage of delay cell are connected, a connecting terminal is used as a third input terminal of the delay module, the control terminals of the $2^2$ 2:1 multiplexers of the fourth stage of delay cell are connected, a connecting terminal is used as a fourth input terminal of the delay module, the control terminals of the two 2:1 multiplexers of the fifth stage of delay cell are connected, a connecting terminal is used as a fifth input terminal of the delay module, and the control terminal of the 2:1 multiplexer of the sixth stage of delay cell is used as a sixth input terminal of the delay module; a logic 1 is accessed to the first input terminal of each 2:1 multiplexer of the first stage of delay cell, a logic 0 is accessed to the second input terminal of each 2:1 multiplexer of the first stage of delay cell, the output terminal of the first 2:1 multiplexer of the first stage of delay cell is connected to the first input terminal of the first 2:1 multiplexer of the second stage of delay cell, the output terminal of the second 2:1 multiplexer of the first stage of delay cell is connected to the second input terminal of the first 2:1 multiplexer of the second stage of delay cell, the output terminal of the third 2:1 multiplexer of the first stage of delay cell is connected to the first input terminal of the second 2:1 multiplexer of the second stage of delay cell, the output terminal of the fourth 2:1 multiplexer of the first stage of delay cell is connected to the second input terminal of the second 2:1 multiplexer of the second stage of delay cell, the output terminal of the fifth 2:1 multiplexer of the first stage of delay cell is connected to the first input terminal of the third 2:1 multiplexer of the second stage of delay cell, the output terminal of the sixth 2:1 multiplexer of the first stage of delay cell is connected to the second input terminal of the third 2:1 multiplexer of the second stage of delay cell, and so on. The output terminal of the $31^{st}$ 2:1 multiplexer of the first stage of delay cell is connected to the first input terminal of the sixteenth 2:1 multiplexer of the second stage of delay cell, and the output terminal of the $32^{st}$ 2:1 multiplexer of the first stage of delay cell is connected to the second input terminal of the sixteenth 2:1 multiplexer of the second stage of delay cell; the output terminal of the first 2:1 multiplexer of the second stage of delay cell is connected to the first input terminal of the first 2:1 multiplexer of the third stage of delay cell, the output terminal of the second 2:1 multiplexer of the second stage of delay cell is connected to the second input terminal of the first 2:1 multiplexer of the third stage of delay cell, the output terminal of third 2:1 multiplexer of the second stage of delay cell is connected to the first input terminal of the second 2:1 multiplexer of the third stage of delay cell, the output terminal of the fourth 2:1 multiplexer of the second stage of delay cell is connected to the second input terminal of the second 2:1 multiplexer of the third stage of delay cell, the output terminal of the fifth 2:1 multiplexer of the second stage of delay cell is connected to the first input terminal of the third 2:1 multiplexer of the third stage of delay cell, the output terminal of the sixth 2:1 multiplexer of the second stage of delay cell is connected to the second input terminal of the third 2:1 multiplexer of the third stage of delay cell, and so on. The output terminal of the fifteenth 2:1 multiplexer of the second stage of delay cell is connected to the first input terminal of the eighth 2:1 multiplexer of the third stage of delay cell, and the output terminal of the sixteenth 2:1 multiplexer of the first stage of delay cell is connected to the second input terminal of the eighth 2:1 multiplexer of the third stage of delay cell; the output terminal of the first 2:1 multiplexer of the third stage of delay cell is connected to the first input terminal of the first 2:1 multiplexer of the fourth stage of delay cell, the output terminal of the second 2:1 multiplexer of the third stage of delay cell is connected to the second input terminal of the first 2:1 multiplexer of the fourth stage of delay cell, the output terminal of the third 2:1 multiplexer of the third stage of delay cell is connected to the first input terminal of the second 2:1 multiplexer of the fourth stage of delay cell, the output terminal of the fourth 2:1 multiplexer of the third stage of delay cell is connected to the second input terminal of the second 2:1 multiplexer of the fourth stage of delay cell, the output terminal of the fifth 2:1 multiplexer of the third stage of delay cell is connected to the first input terminal of the third 2:1 multiplexer of the fourth stage of delay cell, the output terminal of the sixth 2:1 multiplexer of the third stage of delay cell is connected to the second input terminal of the third 2:1 multiplexer of the fourth stage of delay cell, and so on. The output terminal of the seventh 2:1 multiplexer of the third stage of delay cell is connected to the first input terminal of the fourth 2:1 multiplexer of the fourth stage of delay cell, and the output terminal of the eighth 2:1 multiplexer of the third stage of delay cell is connected to the second input terminal of the fourth 2:1 multiplexer of the fourth stage of delay cell; the output terminal of the first 2:1 multiplexer of the fourth stage of delay cell is connected to the first input terminal of the first 2:1 multiplexer of the fifth stage of delay cell, the output terminal of the second 2:1 multiplexer of the fourth stage of delay cell is connected to the second input terminal of the first 2:1 multiplexer of the fifth stage of delay cell, the output terminal of the third 2:1 multiplexer of the fourth stage of delay cell is connected to the first input terminal of the second 2:1 multiplexer of the fifth stage of delay cell, the output terminal of the fourth 2:1 multiplexer of the fourth stage of delay cell is connected to the second input terminal of the second 2:1 multiplexer of the fifth stage of delay cell, the output terminal of the first 2:1 multiplexer of the fifth stage of delay cell is connected to the first input terminal of the first 2:1 multiplexer of the sixth stage of delay cell, the output terminal of the second 2:1 multiplexer of the fifth stage of delay cell is connected to the second input terminal of the first 2:1 multiplexer of the sixth stage of delay cell, and the output terminal of the first 2:1 multiplexer of the sixth stage of delay cell is the output terminal of the delay module; the two delay modules of each switch unit are referred to as a first delay module and a second delay module respectively, and the two 2:1 multiplexers are referred to as a first 2:1 multiplexer and a second 2:1 multiplexer respectively; in each switch unit, a power voltage VCC is accessed to the second input terminals to the sixth input terminals of the first delay module and the second delay module, the first input terminal of the first delay module is connected to the first input terminal of the first 2:1 multiplexer, a connecting terminal is used as a first input terminal of the switch unit, the first input terminal of the second delay module is connected to the first input terminal of the second 2:1 multiplexer, a connecting terminal is used as a second input terminal of the switch unit, the output terminal of the first delay module is connected to the second input terminal of the first 2:1 multiplexer, the output terminal of the second delay module is connected to the second input terminal of the second 2:1 multiplexer, the output terminal of the first 2:1 multiplexer is used as a first output terminal of the switch unit, the output terminal of the second 2:1 multiplexer is used as a second output terminal of the switch unit, the control terminal of the first 2:1 multiplexer is connected to the control terminal of the second 2:1 multiplexer, a connecting terminal is used as a control terminal of the switch unit, the first input terminal and the second input terminal of the first switch unit are connected, a connecting terminal is an input terminal of the strong and weak hybrid PUF circuit to which a pulse signal is accessed, the first output terminal of the $k^{th}$ switch unit is connected to the first input terminal of the $(k+1)^{th}$ switch unit, the second output terminal of the $k^{th}$ switch unit is connected to the second input terminal of the $(k+1)^{th}$ switch unit, k=1, 2, . . . , N−1, the first output terminal of the $N^{th}$ switch unit is connected to the first input terminal of the arbiter, the second output terminal of the $N^{th}$ switch unit is connected to the second input terminal of the arbiter, and the output terminal of the arbiter is used as an output terminal of the strong and weak hybrid PUF circuit and is used to output an original response signal R; and the control terminals of the N switch units are used as N control terminals of the strong and weak hybrid PUF circuit to receive N activation signals $C_1$, $C_2$, . . . and $C_N$.

In this embodiment, the arbiter comprises a first NAND gate N1 and a second NAND gate N2, wherein the first NAND gate N1 and the second NAND gate N2 each have a first input terminal, a second input terminal and an output terminal, the first input terminal of the first NAND gate N1 is the first input terminal of the arbiter, the second input terminal of the first NAND gate N1 is connected to the output terminal of the second NAND gate N2, the first input terminal of the second NAND gate N2 is connected to the output terminal of the first NAND gate N1, a connecting terminal is the output terminal of the arbiter, and the second input terminal of the second NAND gate N2 is the second input terminal of the arbiter.

Figure 4:
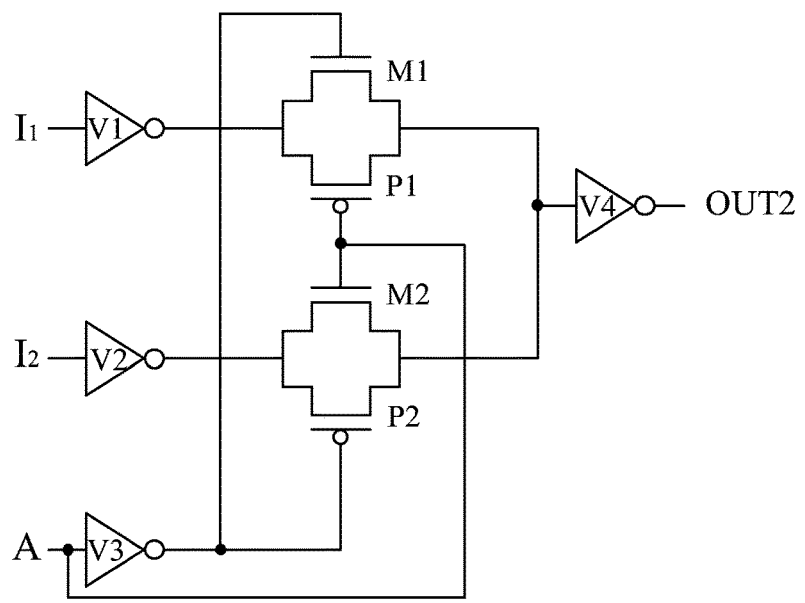
FIG. 4 is a circuit diagram of a 2:1 multiplexer of the strong and weak hybrid PUF circuit of the invention.

As shown in FIG. 4, in this embodiment, each 2:1 multiplexer comprises a first inverter V1, a second inverter V2, a third inverter V3, a fourth inverter V4, a first NMOS transistor M1, a second NMOS transistor M2, a first PMOS transistor P1 and a second PMOS transistor P2, wherein an input terminal of the first inverter V1 is the first input terminal I1 of the 2:1 multiplexer, an input terminal of the second inverter V2 is the second input terminal I2 of the 2:1 multiplexer, an input terminal of the third inverter V3, a gate of the first PMOS transistor P1 and a gate of the second NMOS transistor M2 are connected, a connecting terminal is the control terminal of the 2:1 multiplexer, an output terminal of the first inverter V1, a source of the first NMOS transistor M1 and a source of the first PMOS transistor P1 are connected, an output terminal of the second inverter V2, a source of the second NMOS transistor M2 and a source of the second PMOS transistor P2 are connected, an output terminal of the third inverter V3, a gate of the first NMOS transistor M1 and a gate of the second PMOS transistor P2 are connected, a drain of the first PMOS transistor P1, a drain of the first NMOS transistor M1, a drain of the second PMOS transistor P2, a drain of the second NMOS transistor M2 and an input terminal of the fourth inverter V4 are connected, and an output terminal of the fourth inverter V4 is the output terminal OUT2 of the 2:1 multiplexer.

Figure 5:
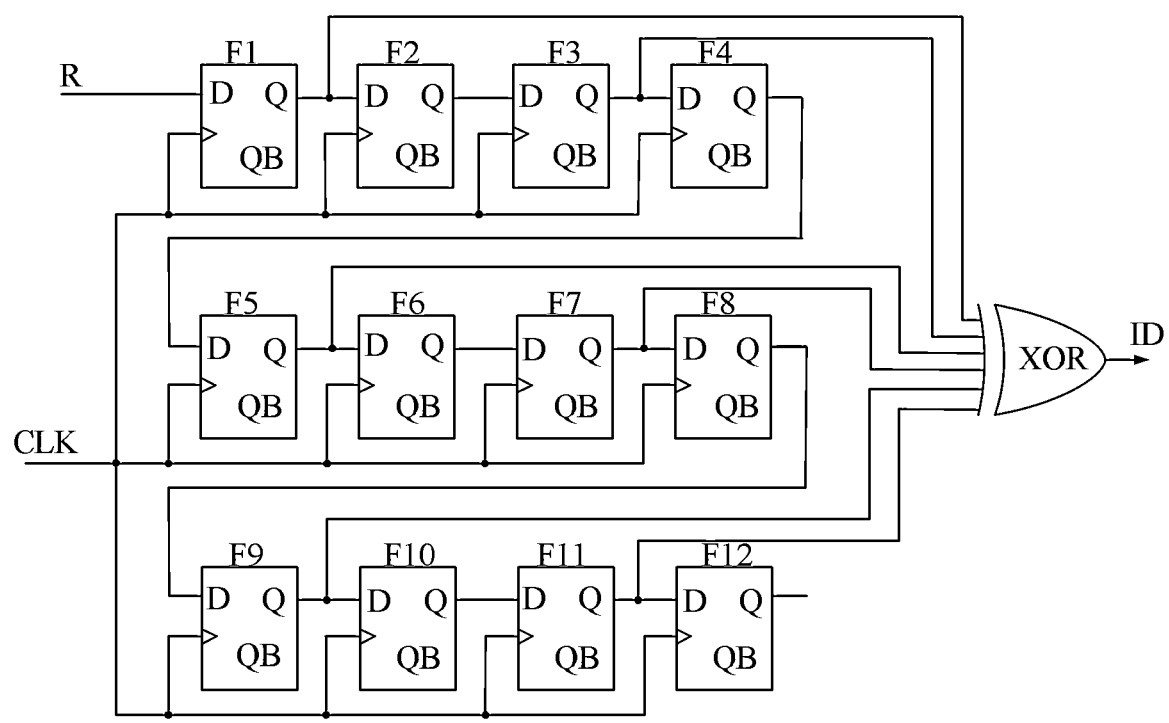
FIG. 5 is a circuit diagram of a post-processing circuit of the strong and weak hybrid PUF circuit of the invention.

Embodiment 2: This embodiment is basically identical with Embodiment 1, and differs from Embodiment 1 in the following aspects: as shown in FIG. 5, in this embodiment, a post-processing circuit is disposed at the output terminal of the arbiter, an original response signal R output by the output terminal of the arbiter is processed by the post-processing circuit and is then output as a final response signal ID, the post-processing circuit comprises twelve D flip-flops F1-F12 and a six-input XOR gate XOR, each D flip-flop comprises a clock terminal, an input terminal and an output terminal, the six-input XOR gate XOR comprises sixth input terminals and an output terminal, the clock terminals of the twelve D flip-flops are connected, a connecting terminal is used as a clock terminal of the post-processing circuit to receive a clock signal CLK, the input terminal of the first D flip-flop is used as an input terminal of the post-processing circuit and is connected to the output terminal of the arbiter, the output terminal of the $h^{th}$ D flip-flop is connected to the input terminal of the $(h+1)^{th}$ D flip-flop, and h=1, 2, . . . , 11; the output terminal of the first D flip-flop, the output terminal of the third D flip-flop, the output terminal of the fifth D flip-flop, the output terminal of the seventh D flip-flop, the output terminal of the ninth D flip-flop and the output terminal of the eleventh D flip-flop are connected to the six input terminals of the six-input XOR gate XOR in one-to-one correspondence, and the output terminal of the six-input XOR gate XOR is used as an output terminal of the post-processing circuit and is used to output the final response signal ID.

Figure 6A:
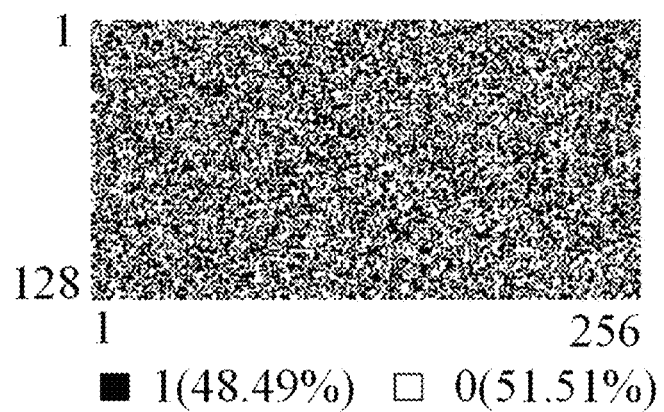
FIG. 6A is a 2D map of a final output response of the strong and weak hybrid PUF circuit of the invention.
Figure 6B:
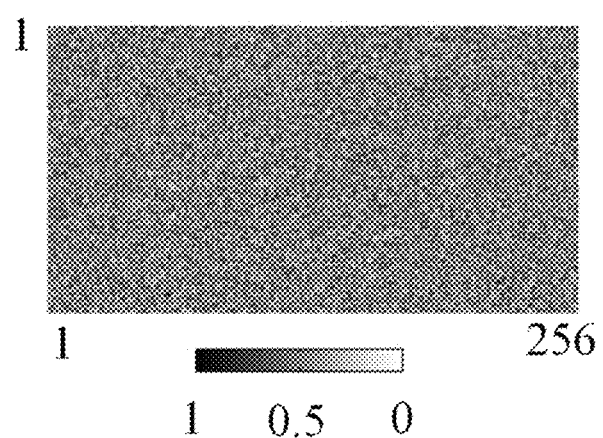
FIG. 6B is an average grayscale map of the final output response of the strong and weak hybrid PUF circuit of the invention.

The randomness is evaluated mainly by observing the probability statistical distribution of logic 0 and logic 1 in output responses of the PUF circuit, and the PUF randomness is visually represented by a grayscale map. 100 strong and weak hybrid PUF circuits of the invention are fabricated, one is randomly selected from the 100 strong and weak hybrid PUF circuits, and a grayscale map of the final output response of the selected strong and weak hybrid PUF circuit is shown in FIG. 6A, wherein the white pixel represents logic 0, the black pixel represent logic 1, the probability of logic 0 and the probability of logic 1 in the final output response are 51.51% and 48.49% respectively, and the corresponding randomness is 96.98% (which is close to the ideal value 100%, and no obvious bias is caused). In addition, the other 99 strong and weak hybrid PUF circuits have similar statistical results. An average grayscale map of the final output responses of the 100 strong and weak hybrid PUF circuits is shown in FIG. 6B. It can be known, by analyzing FIG. 6B, the average grayscale fluctuates near 0.5, and there is no obvious spatial correlation.

Figure 7:
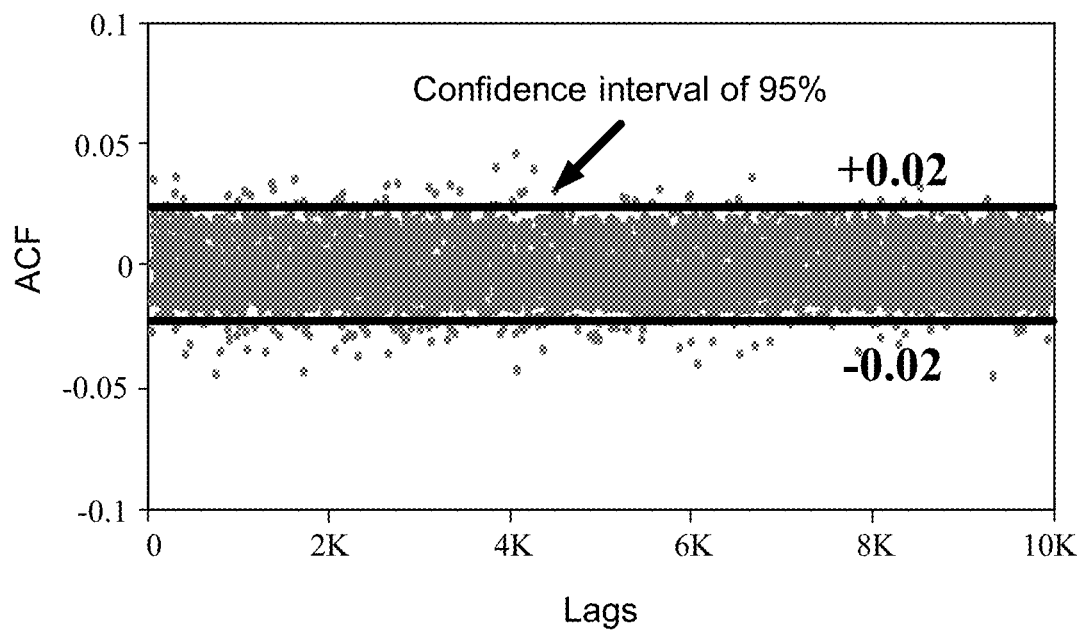
FIG. 7 is an autocorrelation analysis chart of the final output response of the strong and weak hybrid PUF circuit of the invention.

The correlation is used to evaluate the degree of correlation between PUF output responses, and the smaller a correlation value, the lower the correlation between output responses. A result obtained by carrying out autocorrelation analysis on the final output response of the strong and weak hybrid PUF circuit of the invention with an autocorrelation function is shown in FIG. 7. The test result indicates that the ACF value of the strong and weak hybrid PUF circuit within a confidential interval of 95% is 0.02 (which is close to the ideal value 0), so the strong and weak hybrid PUF circuit has good spatial independence. To sum up, the strong and weak hybrid PUF circuit of the invention has good randomness.

Figure 8:
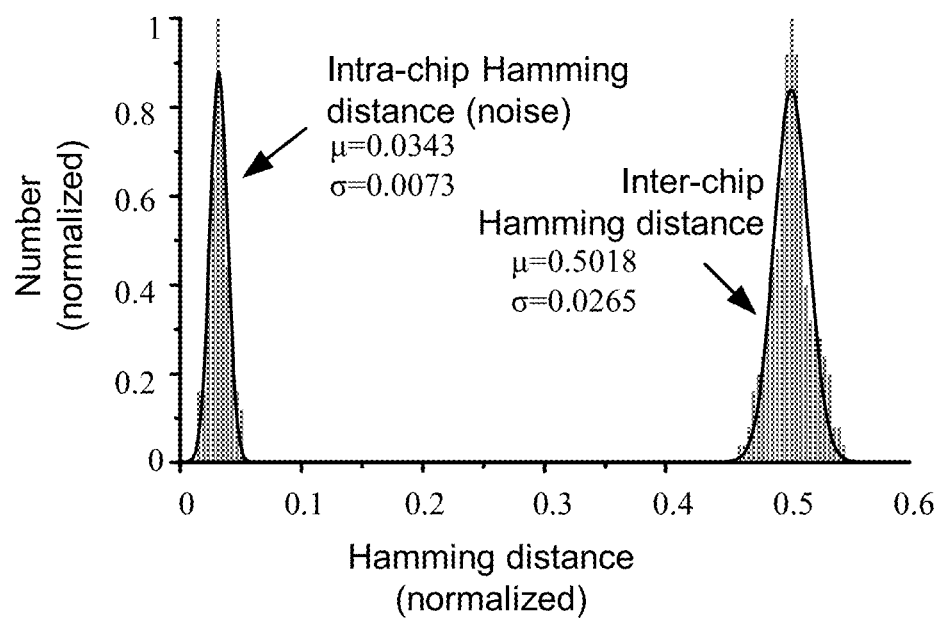
FIG. 8 is a statistical histogram of inter-chip Hamming distances and intra-chip Hamming distances of the final output of the strong and weak hybrid PUF circuit of the invention.

The uniqueness is used to identify the discrimination of different PUF individuals, and is typically evaluated by the average inter-chip Hamming distance. A statistical histogram (including a fit curve) of the average HD of the strong and weak hybrid PUF circuit of the invention is shown in FIG. 8. As shown in FIG. 8, the normalized average intra-chip HD and inter-chip HD are 0.0343 and 0.5018 respectively (the corresponding uniqueness is 99.64%, which is close to the ideal value 100%). So, the strong and weak hybrid PUF circuit of the invention has good uniqueness.

Figure 9:
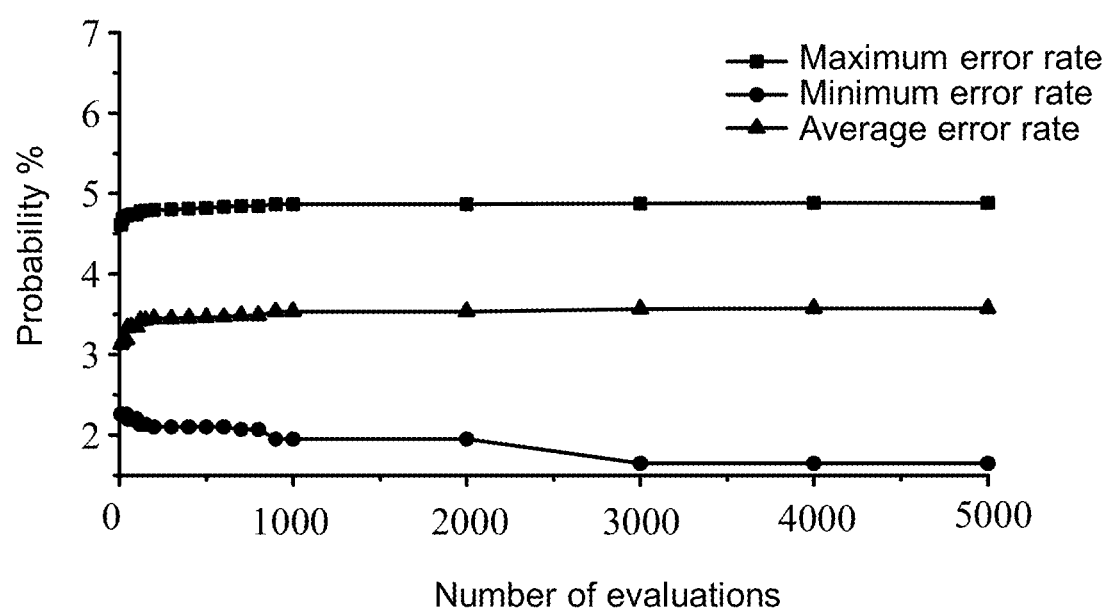
FIG. 9 is a curve chart of error rates of the final output response under normal temperature and pressure of the final output response of the strong and weak hybrid PUF circuit of the invention.

In addition, statistical characteristics of the maximum, minimum and average error rates corresponding to the final output responses of the strong and weak hybrid PUF circuit when the strong and weak hybrid PUF circuit is cyclically read 5000 times under normal temperature and pressure are shown in FIG. 9. As can be seen from FIG. 9, the average error rate and the maximum error rate start to become stable after being evaluated 1000 times, tend to be stable with the increase of the number of evaluations, and are finally stabilized to 3.4% and 4.8%, respectively. The minimum error rate is gradually decreased along with the increase of the number of evaluations, and is close to 0% when the number of evaluations is large enough.

To sum up, the strong and weak hybrid PUF circuit of the invention is able to realize organic unity of a strong PUF circuit and a weak PUF circuit by means of the same PUF circuit topological structure by selecting different numbers of switch units in the circuit operating process according to the Hamming weight of input activation, overcomes the defects of traditional strong and weak PUF discrete designs under the precondition of guaranteeing the good randomness, uniqueness and reliability (under normal temperature and pressure) of an original PUF circuit, and is able to generate weak PUF activation response pairs as well as strong PUF activation response pairs; the strong and weak hybrid PUF circuit is configured into a weak PUF circuit of a weak PUF topological structure in scenarios where a small number of activation response pairs are needed (such as key generation); and in scenarios where a large number of activation response pairs are needed (such as equipment identification), the strong and weak hybrid PUF circuit is configured into a strong PUF circuit. In this way, the strong and weak hybrid PUF circuit has the advantages of the weak PUF circuit as well as the advantages of the strong PUF circuit, and expands the application scenarios of a single PUF circuit.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A strong and weak hybrid PUF circuit, comprising:
N switch units and an arbiter, wherein N is an integer greater than or equal to 2, the arbiter comprises a first input terminal, a second input terminal and an output terminal, each switch unit consists of two delay modules and two 2:1 multiplexers, the N switch units form two completely symmetrical delay paths, and each 2:1 multiplexer comprises a first input terminal, a second input terminal, a control terminal and an output terminal,
wherein each of the two delay modules consists of six stages of delay cells, an $i^{th}$ stage of delay cell consists of $2^{6-i}$ 2:1 multiplexers, wherein i=1, 2, 3, 4, 5, 6,
for i=1, the control terminals of the $2^5$ 2:1 multiplexers of the first stage of delay cell are connected, a connecting terminal is used as a first input terminal of the delay module,
for i=2, the control terminals of the $2^4$ 2:1 multiplexers of the second stage of delay cell are connected, a connecting terminal is used as a second input terminal of the delay module,
for i=3, the control terminals of the $2^3$ 2:1 multiplexers of the third stage of delay cell are connected, a connecting terminal is used as a third input terminal of the delay module,
for i=4, the control terminals of the $2^2$ 2:1 multiplexers of the fourth stage of delay cell are connected, a connecting terminal is used as a fourth input terminal of the delay module,
for i=5, the control terminals of the two 2:1 multiplexers of the fifth stage of delay cell are connected, a connecting terminal is used as a fifth input terminal of the delay module,
for i=6, the control terminal of the 2:1 multiplexer of the sixth stage of delay cell is used as a sixth input terminal of the delay module,
wherein a logic 1 is accessed to the first input terminal of each 2:1 multiplexer of the first stage of delay cell, a logic 0 is accessed to the second input terminal of each 2:1 multiplexer of the first stage of delay cell,
wherein the first input terminal and the second input terminal of the 2:1 multiplexer of any of the delay cells in any of the first to sixth stages are respectively connected to the two outputs of the two 2:1 multiplexers of the delay cell of its previous stage, wherein the output terminal of the first 2:1 multiplexer of the sixth stage of delay cell is the output terminal of the delay module, wherein the two delay modules of each switch unit are referred to as a first delay module and a second delay module respectively, and the two 2:1 multiplexers are referred to as a first 2:1 multiplexer and a second 2:1 multiplexer respectively; in each switch unit, a power voltage is accessed to the second input terminals to the sixth input terminals of the first delay module and the second delay module, the first input terminal of the first delay module is connected to the first input terminal of the first 2:1 multiplexer, a connecting terminal is used as a first input terminal of the switch unit, the first input terminal of the second delay module is connected to the first input terminal of the second 2:1 multiplexer, a connecting terminal is used as a second input terminal of the switch unit, the output terminal of the first delay module is connected to the second input terminal of the first 2:1 multiplexer, the output terminal of the second delay module is connected to the second input terminal of the second 2:1 multiplexer, the output terminal of the first 2:1 multiplexer is used as a first output terminal of the switch unit, the output terminal of the second 2:1 multiplexer is used as a second output terminal of the switch unit, the control terminal of the first 2:1 multiplexer is connected to the control terminal of the second 2:1 multiplexer, a connecting terminal is used as a control terminal of the switch unit, the first input terminal and the second input terminal of the first switch unit are connected, a connecting terminal is an input terminal of the strong and weak hybrid PUF circuit to which a pulse signal is accessed, the first output terminal of the $k^{th}$ switch unit is connected to the first input terminal of the $(k+1)^{th}$ switch unit, the second output terminal of the $k^{th}$ switch unit is connected to the second input terminal of the $(k+1)^{th}$ switch unit, $k=1, 2, \ldots, N-1$, the first output terminal of the $N^{th}$ switch unit is connected to the first input terminal of the arbiter, the second output terminal of the $N^{th}$ switch unit is connected to the second input terminal of the arbiter, and the output terminal of the arbiter is used as an output terminal of the strong and weak hybrid PUF circuit and is used to output an original response signal; and the control terminals of the N switch units are used as N control terminals of the strong and weak hybrid PUF circuit and allow N activation signals to be accessed thereto.

2. The strong and weak hybrid PUF circuit according to claim 1, wherein the arbiter comprises a first NAND gate and a second NAND gate, wherein each of the first NAND gate and the second NAND gate comprises a first input terminal, a second input terminal and an output terminal, the first input terminal of the first NAND gate is the first input terminal of the arbiter, the second input terminal of the first NAND gate is connected to the output terminal of the second NAND gate, the first input terminal of the second NAND gate is connected to the output terminal of the first NAND gate, a connecting terminal is the output terminal of the arbiter, and the second input terminal of the second NAND gate is the second input terminal of the arbiter.

3. The strong and weak hybrid PUF circuit according to claim 1, wherein each 2:1 multiplexer comprises a first inverter, a second inverter, a third inverter, a fourth inverter, a first NMOS transistor, a second NMOS transistor, a first PMOS transistor and a second PMOS transistor, wherein an input terminal of the first inverter is the first input terminal of the 2:1 multiplexer, an input terminal of the second inverter is the second input terminal of the 2:1 multiplexer, an input terminal of the third inverter, a gate of the first PMOS transistor and a gate of the second NMOS transistor are connected, a connecting terminal is the control terminal of the 2:1 multiplexer, an output terminal of the first inverter, a source of the first NMOS transistor and a source of the first PMOS transistor are connected, an output terminal of the second inverter, a source of the second NMOS transistor and a source of the second PMOS transistor are connected, an output terminal of the third inverter, a gate of the first NMOS transistor and a gate of the second PMOS transistor are connected, a drain of the first PMOS transistor, a drain of the first NMOS transistor, a drain of the second PMOS transistor, a drain of the second NMOS transistor and an input terminal of the fourth inverter are connected, and an output terminal of the fourth inverter is the output terminal of the 2:1 multiplexer.

4. The strong and weak hybrid PUF circuit according to claim 1, wherein a post-processing circuit is disposed at the output terminal of the arbiter, an original response signal output by the output terminal of the arbiter is processed by the post-processing circuit and is then output as a final response signal, the post-processing circuit comprises twelve D flip-flops and a six-input XOR gate, each D flip-flop comprises a clock terminal, an input terminal and an output terminal, the six-input XOR gate comprises sixth input terminals and an output terminal, the clock terminals of the twelve D flip-flops are connected, a connecting terminal is used as a clock terminal of the post-processing circuit to receive a clock signal, the input terminal of the first D flip-flop is used as an input terminal of the post-processing circuit and is connected to the output terminal of the arbiter, the output terminal of the $h^{th}$ D flip-flop is connected to the input terminal of the $(h+1)^{th}$ D flip-flop, and $h=1, 2, \ldots, 11$; the output terminal of the first D flip-flop, the output terminal of the third D flip-flop, the output terminal of the fifth D flip-flop, the output terminal of the seventh D flip-flop, the output terminal of the ninth D flip-flop and the output terminal of the eleventh D flip-flop are connected to the six input terminals of the six-input XOR gate in one-to-one correspondence, and the output terminal of the six-input XOR gate is used as an output terminal of the post-processing circuit and is configured to output the final response signal.

* * * * *